(12) United States Patent
Gesek

(10) Patent No.: US 12,154,004 B2
(45) Date of Patent: *Nov. 26, 2024

(54) SYSTEMS AND METHODS INVOLVING HYBRID QUANTUM MACHINES, ASPECTS OF QUANTUM INFORMATION TECHNOLOGY AND/OR OTHER FEATURES

(71) Applicant: QMware AG, St. Gallen (CH)

(72) Inventor: Georg Gesek, Vienna (AT)

(73) Assignee: QMware AG, St. Gallen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/212,170

(22) Filed: Jun. 20, 2023

(65) Prior Publication Data

US 2023/0351231 A1    Nov. 2, 2023

Related U.S. Application Data

(63) Continuation of application No. 17/295,025, filed as application No. PCT/US2019/062299 on Nov. 19, 2019, now Pat. No. 11,699,092.

(Continued)

(51) Int. Cl.
*G06F 13/20* (2006.01)
*G06F 7/57* (2006.01)
(Continued)

(52) U.S. Cl.
CPC ............. *G06N 10/00* (2019.01); *G06F 7/57* (2013.01); *G06F 13/4221* (2013.01); *G06F 2213/0026* (2013.01)

(58) Field of Classification Search
CPC ........ G06N 10/00; G06N 10/20; G06N 10/80; G06N 10/40; G06N 3/08; G06N 5/048;
(Continued)

(56) References Cited

U.S. PATENT DOCUMENTS 9,348,008 B2 * 5/2016 Yu .......................... G01R 33/50
11,699,092 B2 * 7/2023 Gesek ................... G06N 10/20
710/313

(Continued)

FOREIGN PATENT DOCUMENTS

JP     2018521382 A    8/2018
WO    2007077617      12/2007

OTHER PUBLICATIONS

Sutor, Robert S., "Dancing with Qubits: How quantum computing works and how it can change the world," Packt Publishing, 2019; 23 pages.

(Continued)

*Primary Examiner* — Henry Tsai
*Assistant Examiner* — Kim T Huynh
(74) *Attorney, Agent, or Firm* — Greenberg Traurig, LLP

(57) ABSTRACT

Systems and methods involving quantum machines, hybrid quantum machines, aspects of quantum information technology and/or other features are disclosed. In one exemplary implementation, a system is provided comprising a quantum register that stores quantum information using qubits, wherein the qubits are configured to store the quantum information using particles or objects arranged in a lattice of quantum gates, a clock that provides a clock cycle to the quantum register, and a qubit-tie computing component coupled to the quantum register, wherein the qubit-tie computing component is configured to shift the quantum information between the qubits, wherein the system stores the qubits in different states using physical qualities, which may define qubits that are configured to be entangled and superposed at a same time. Further, the quantum register may (Continued)

comprise an entanglement component, and/or the qubit-tie computing component may comprise a superposition component.

66 Claims, 4 Drawing Sheets

Related U.S. Application Data

(60) Provisional application No. 62/769,455, filed on Nov. 19, 2018.

(51) Int. Cl.
   *G06F 13/42* (2006.01)
   *G06N 10/00* (2022.01)

(58) Field of Classification Search
   CPC .......... G06N 10/70; G06N 10/60; G06N 3/04; G06F 7/57; G06F 13/4221; G06F 2213/0026; B82Y 10/00
   See application file for complete search history.

(56) References Cited

U.S. PATENT DOCUMENTS

| | | | |
|---|---|---|---|
| 11,921,755 B2* | 3/2024 | Baughman | G06F 18/231 |
| 2011/0125460 A1 | 5/2011 | Suzuki | |
| 2015/0026112 A1 | 1/2015 | Alboszta et al. | |
| 2016/0292587 A1 | 10/2016 | Rigetti et al. | |
| 2016/0328253 A1* | 11/2016 | Majumdar | G06N 3/126 |
| 2018/0180970 A1 | 6/2018 | Klotzer | |
| 2020/0110789 A1* | 4/2020 | Robert | G06N 10/00 |
| 2020/0364600 A1 | 11/2020 | Elsherbini et al. | |
| 2022/0084085 A1 | 3/2022 | Rigetti et al. | |

OTHER PUBLICATIONS

Sysoev, S.S., "Introduction to Quantum Computing. Quantum Algorithms," St. Petersburg State University, 2019; 145 pages.

Office Action issued Dec. 18, 2023, in counterpart Eurasian patent appln. No. 202191416/31 (5 pgs.) as well as English language translation of same (4 pgs.); 9 pages total.

Office Action issued in counterpart JP appln. No. 2021528848 (4 pgs) and machine translation thereof from J-Plat Patent (5 pgs), dated Dec. 26, 2022; 9 pages total.

Office Action issued in counterpart Israel appln. No. 283255, dated Aug. 17, 2023; 7 pages total.

Brandl, Matthias F. "A Quantum von Neumann Architecture for Large-Scale Quantum Computing," arXiv preprint arXiv: 1702.02583, 2017, pp. 1-44 (44 pgs.).

Crenshaw, Michael E., "The total energy-momentum tensor for electromagnetic fields in a dielectric," Optical Trapping and Optical Micromanipulation XIV, 2017, vol. 10347, SPIE, pp. 405-413 (9 pgs.).

Elhoushi et al., "Modelling a Quantum Processor Using the QRAM Model," Proceedings of 2011 IEEE Pacific Rim Conference on Communications, Computers and Signal Processing, IEEE, 2011, pp. 409-415 (7 pgs.).

Australian Examination Report, AU 2019383395, mailed on Jun. 10, 2022, 3 pgs.

International Search Report and Written Opinion dated Mar. 5, 2020, issued in counterpart PCT Application No. PCT/US2019/062299; 15 pgs.

* cited by examiner

SYSTEMS AND METHODS INVOLVING HYBRID QUANTUM MACHINES, ASPECTS OF QUANTUM INFORMATION TECHNOLOGY AND/OR OTHER FEATURES

CROSS-REFERENCE TO RELATED APPLICATION(S) INFORMATION

This application is a continuation of U.S. application Ser. No. 17/295,025, filed May 18, 2021, now U.S. Pat. No. 11,699,092, which is a U.S. National Stage application under 35 U.S.C. 371 of International application No. PCT/US19/62299, filed Nov. 19, 2019, published as WO2020/106777A1, and which claims benefit of and priority to U.S. provisional patent application No. 62/769,455, filed Nov. 19, 2018, all of which are incorporated herein by reference in entirety.

BACKGROUND

Field

The disclosed technology relates to the field(s) of Computer Science, Quantum Information Theory, Quantum Physics, Computer Architecture, Quantum Processing and/or Storing Components with their Physical Structure.

Description of Related Art

Our conventional computers are based on the theory of computation mainly by Alan Turing and different architectural concepts like the one by John von Neumann. Thus, todays computers used for many applications in industry and commercial products are so-called Turing machines which basically transform a set of input states, called data, into a set of output states, also being data, which is also named the 'result' or the 'solution' of a problem. The computation in between, which generates this transformation of data, is called an algorithm, since the Turing machine is only capable of sequentially execution of mathematical functions which are hard-wired in the central processing unit's Arithmetic and Logic Unit (ALU). The program itself consists therefor of a set of so called machine codes, which simply select the ALU's functions one after the other. One can encode a mathematical problem in such a program for a Turing machine and if the Turing machine will stop the execution after a finite number of steps, the problem is solved by a finite result, which is another set of data.

All Turing machines (such as the exemplary one shown in FIG. 1) have in common that they can be physically built by means of classical mechanics. In that way, Turing machines are highly predictable, theoretically deterministic, which is expressed by the fact that a certain set of input data will every time result in the same set of output data, regardless how often the program is being executed. The Turing machine is also limited in its capability only to execute one program step after the other, sequentially. One can run a larger number of Turing machines side by side, but as soon as it comes to an interaction between them via data exchange, one Turing machine has to wait for the result of the other.

All those implications lead to the class of problems "P", which represent all problems which can be encoded to a program on a Turing machine, which will halt after a time, which is proportional to a polynomial function on the size of input data. In general, problems which are in the class of P can be solved by a modern Turing machine within a sound amount of time. But there are many known problems, which we do not know a program for, capable of solving them in polynomial time, but only as an exponential function of the input size. Thus, the solutions of such problems are exceeding the capacity of any Turing machine very soon by increasing the input data size.

The fundamental solution for this issue are new types of computational machines, like neural networks or quantum computers. Neural networks can be understood as massive parallel computing structures with a huge amount of logical gates which are vastly interconnected. Thus they cannot be programmed with explicit algorithms but they are taught by examples and as a result, the whole neural network becomes a huge algorithm itself, which cannot be thoroughly formalized anymore because of its complexity, solving the problem on a global scale. The natural implementation of neural networks are neuronal networks, like the human brain.

Quantum computers are a totally different approach to overcome the fundamental computational limits of Turing machines, which are no longer based on classical deterministic mechanics, but directly on quantum mechanics. Although some theoretical concepts of such machines have been proposed and/or known for some 20 years, several major achievements were still missing, in order to realize a commercial successful implementation of a Quantum Computer, and which are described further below.

Another significant point, here, is that due to the fundamental difference of quantum and classical algorithms, a software written for a Turing machine cannot run on a Quantum machine and vice versa. But the direct commercial value of the installed base of software for Turing machines, our today's computers, exceeds a trillion USD and indirect the majority of all businesses in industrial developed countries are depending on this software for Turing machines. One cannot expect to successfully market a pure Quantum machine, where all the software has to be reproduced prior to use, while the even potentially slower Turing machines are still running fine with the well-known deterministic algorithms. Accordingly, a Hybrid Quantum Computer that is capable of both, quantum and sequential deterministic algorithms (as set forth in the innovations, below, for example) is highly desirable, if not a necessity in various instances.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION OF ILLUSTRATIVE IMPLEMENTATIONS

As indicated above, while some theoretical concepts of such machines have already been proposed and/or are known regarding quantum computers, some major achievements were still missing in order to realize a commercial successful implementation of a quantum computer. First, for example, a model for a universal quantum machine defining technical solutions to the existing technical problems of the quantum analogue to the computational class of Turing machines and their connection to the classes of computational complexity was missing. Second, a physical implementation of a hybrid quantum computer also having technical solutions to the existing technical problems of cache coherency between different kinds of processing units while maintaining the high bandwidth of data exchange between them, as needed to achieve quantum information processing in practice, was also missing. The technical solutions regarding both of these innovations are described further below, in Section 1, and in Sections 2-3, respectively.

1. Technology Overview Regarding the Universal Quantum Machine

While the class of problems which can be solved by a Turing machine in polynomial time is named P, the class of problems which can be solved by a Universal Quantum machine within polynomial time may be called QP. There is also a theoretical extension to the class of P by adding a stochastic source to the Turing machine, so that it is also capable of the generation of a true random number, which leads to the class of problems which can be solved by such a Nondeterministic Turing machine in polynomial time, named NP. It should be kept in mind that there is yet no final theory of complexity classes due to the fact that we did not manage to decide whether P< or =NP and NP< or =QP. Further, we cannot yet perfectly tell a Universal Quantum machine, by definition capable of calculating all possible quantum algorithms in the least possible amount of computational time, from a Quantum machine with limitations. Nevertheless, the Quantum Information Theory contains information related to this puzzle and the Quantum Computer, such as set forth herein, will help us to elaborate these subtle differences.

Figure 2:
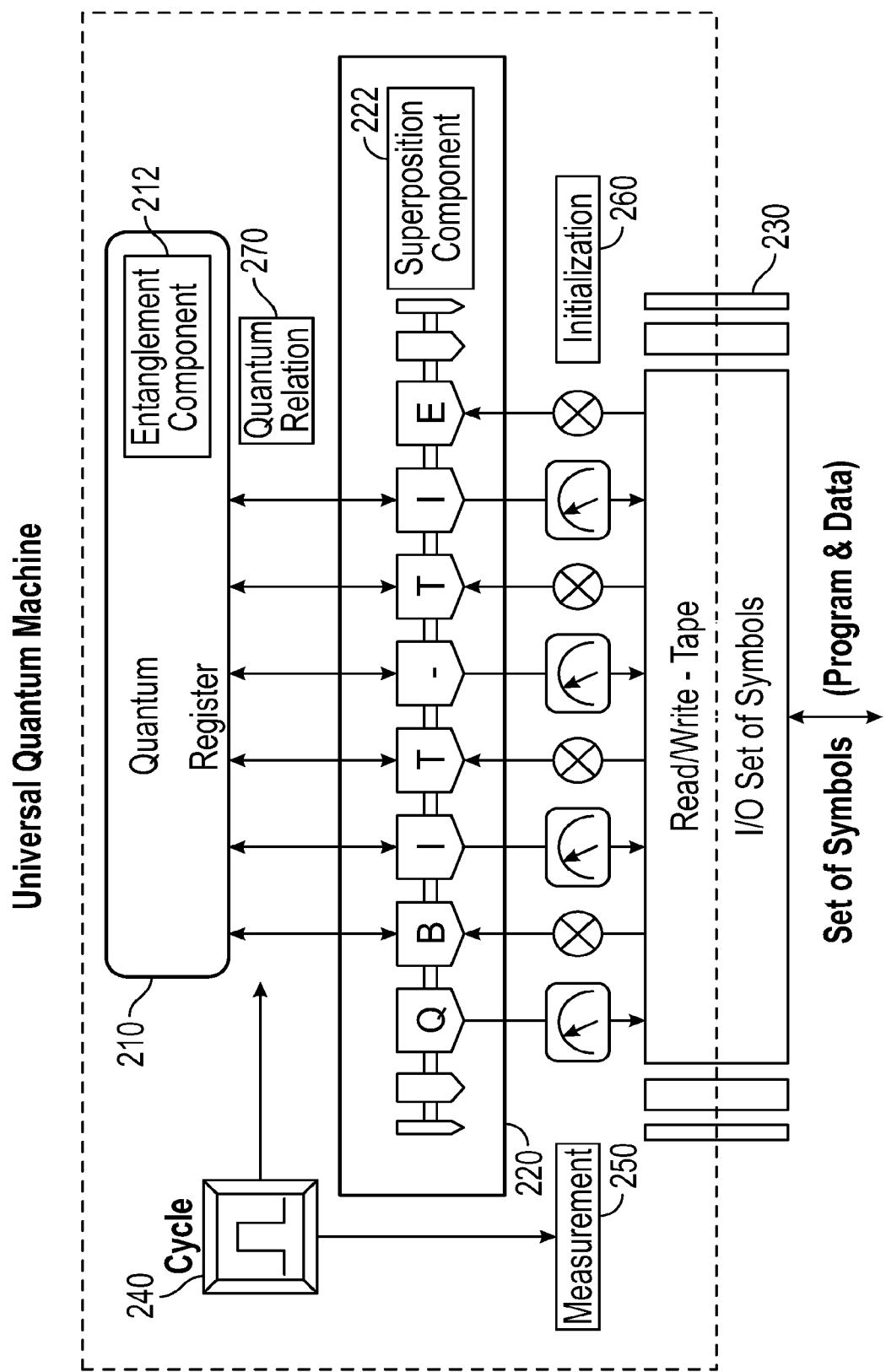
FIG. 2 is a block diagram of an exemplary universal quantum machine, consistent with exemplary aspects of certain embodiments of the present disclosure.

The presently disclosed technology may utilize and/or involve the following exemplary aspects or scheme for the general model valid with any universal quantum machine, as shown in FIG. 2. Further, aspects herein are based on the principle/insight that there are no other true stochastic sources other than quantum effects, thus quantum algorithms, in the universe. Taking this into account, the theoretical expansion of a deterministic Turing machine by a stochastic source ultimately leads to a quantum machine with limitations. On the other hand, a deterministic process is never able to produce a true stochastic source, by definition. This leads to the conclusion that P has to be <NP, since the task of producing a true random number never halts on a deterministic Turing machine, but can be easily achieved by an Indeterminate Turing machine. Since NP in that sense is a subset of QP, it is believed to follow that QP>NP>P.

Figure 1:
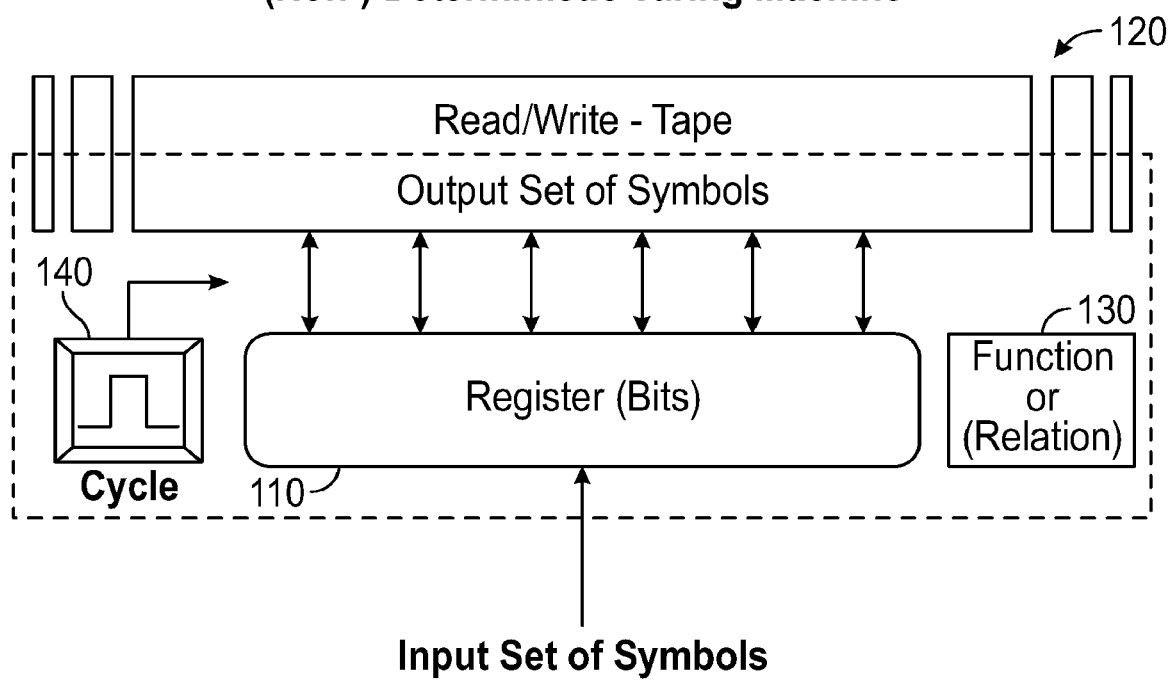
FIG. 1 is a block diagram of a known Turing machine.

As explained in connection with FIGS. 1 and 2, a comparison of the architectures of a Turing machine and the disclosed universal quantum machine is explained as follows. Referring to FIG. 1, such Turing machine may include a register 110 of conventional bits, which can be directly fed from an external source of symbols (input set of symbols), and then being interpreted by the machine as program instructions or data. The language is fairly easy, there are commands to move the memory band 120 (read/write-tape) connected to the register, as well as commands for writing or reading the symbols on this band. The individual positions on the tape are well defined, in computer terms, i.e., such positions are "addressable". Each process step of the computer program is temporally separated from the other by the means of a clock 140 (cycle).

Apart from the program commands to move, read and write the tape on arbitrary positions, the arithmetic & logic unit 130 (ALU) of the Turing machine may implement all necessary mathematical functions, in order to perform all kinds of operations. Functions that are more complex can be split into a set of easier functions. This is where the so-called deterministic Turing machine differs from the non-deterministic. While the deterministic Turing machine has only functions available that can produce only one specific output from a certain input, the non-deterministic Turing machine has the capability of a relation as well, which is therefore able to produce several versions of outputs from only one set of input. The version of the possible results selected is purely random, determined by a non-predictable, stochastic source. The so-called non-deterministic Turing machine (NDTM) therefore is not the opposite of the deterministic (DTM) variant, but has to be understood as relational extension to it. Turning back to the disclosed technology, the innovations herein may include and/or involve the system(s)/implementation(s) set forth in FIG. 2, which achieves the archetype of the universal quantum machine, and which is capable of both quantum and sequentially deterministic operation as well as nondeterministic algorithms.

From outside, seen as a black box, the example universal quantum machine (UQM) illustrated in FIG. 2 works analog to the non-deterministic Turing machine (NDTM), which also allows ambiguous relations. From one and the same input set, therefore, different output sets can derive, which makes the result of the universal quantum machine partly unpredictable. Between the sets of input and output lies an algorithm which includes quantum relations.

Regarding differences between the universal quantum machine and the Turing machine, the quantum information stored within the quantum register 210 (upper area in the figure) cannot be copied due to non-cloning-requirement imposed by quantum mechanics, unlike classical information. This is so because interaction with the quantum machine is needed in order to make an input, which would cause the quantum information inside the register to be nullified, deleted or destroyed. However, the quantum register merely stores quantum states, which would be destroyed by such an effort.

Therefore, the presently-disclosed quantum machine not only uses the classical read-write-tape 230 for the output of the calculation result, but also for the return of values stored in the register as well as for the inclusion of the input data. To perform quantum algorithms at all, a suitable physical process of 'initialization', i.e. introduction, is first employed to transfer these classic, and therefore deterministic, data sets, into quantum states 260, which are referred to herein as qubits. These qubits are stored on a qubit tape 220, which is referred to in FIG. 2 as the "QBIT-TIE". In that manner the classical bits become super positioned qubits, which can be directly read, written, and processed by the quantum register. The operation here is analog to the Turing machine, but instead of classical algorithms, quantum algorithms 270 come into action and instead of data stored on classical bits, the information resides on qubits. The quantum register is capable of entanglement of qubits and the qubit-tie provides superpositioning of qubits. As shown in the exemplary implementation of FIG. 2, such entanglement may be provided via an entanglement component 212 within the quantum register 210, and such superposition may be provided via a superposition component 222 within the qubit-tie computing component 220.

Here, it is further noted that, while the expression "tape" is used herein for legacy reasons, e.g. as a term of art, such storage media may encompass one or more of any memory technology beyond traditional tape (e.g., magnetic) storage.

To emit a calculation result by the present quantum machine, it is not enough just to read the output of the read-write-tape, but the inverse process to the initialization must be performed beforehand, namely a measurement 250 of the qubits, as represented by the instrument symbols in FIG. 2. This measurement includes the stochastic effect, that of the superposed states which occur in a qubit, according to inherent probabilities, which in turn result from the previously established quantum gates in the register, and result in partly deterministic and random, classical output quantities, referred to as output bits. These output bits are written equally (e.g., via such previously established quantum gates), such as by the Turing machine on the classical memory tape 230, and are available either as a result, or as a classical cache for the algorithm of the universal quantum machine. It is apparent therefore that the presently disclosed universal quantum machine is capable of performing both classical as well as quantum algorithms, thus enabling it to emulate an entire Turing machine. Indeed, most of the known quantum algorithms, like the one by Shore, use both classical and quantum functions, which are alternately composed.

As can be seen, evidence establishes that the presently-disclosed quantum machine is universal, e.g. over any suggestion that all existing quantum relations have not been discovered: firstly, all our physical models, which describe the natural quantum systems in the universe, are merely composed of superposition and entanglement. Secondly, the inventors work in Quantum Information Technology (QIT), [see, e.g., Theory of Quantum Information as the Theory of Everything, Georg Gesek, 2009-2012, which is incorporated herein by reference], shows with its fundamental graph theory that all possible arrangements of information stored in the universe are fully described by superposition and entanglement. Hence, the universal character of the architecture shown in FIG. 2, i.e., the universal quantum machine, may be defined and established within this context.

2. Physical Implementation(s) of a Hybrid Quantum Computer

Figure 3:
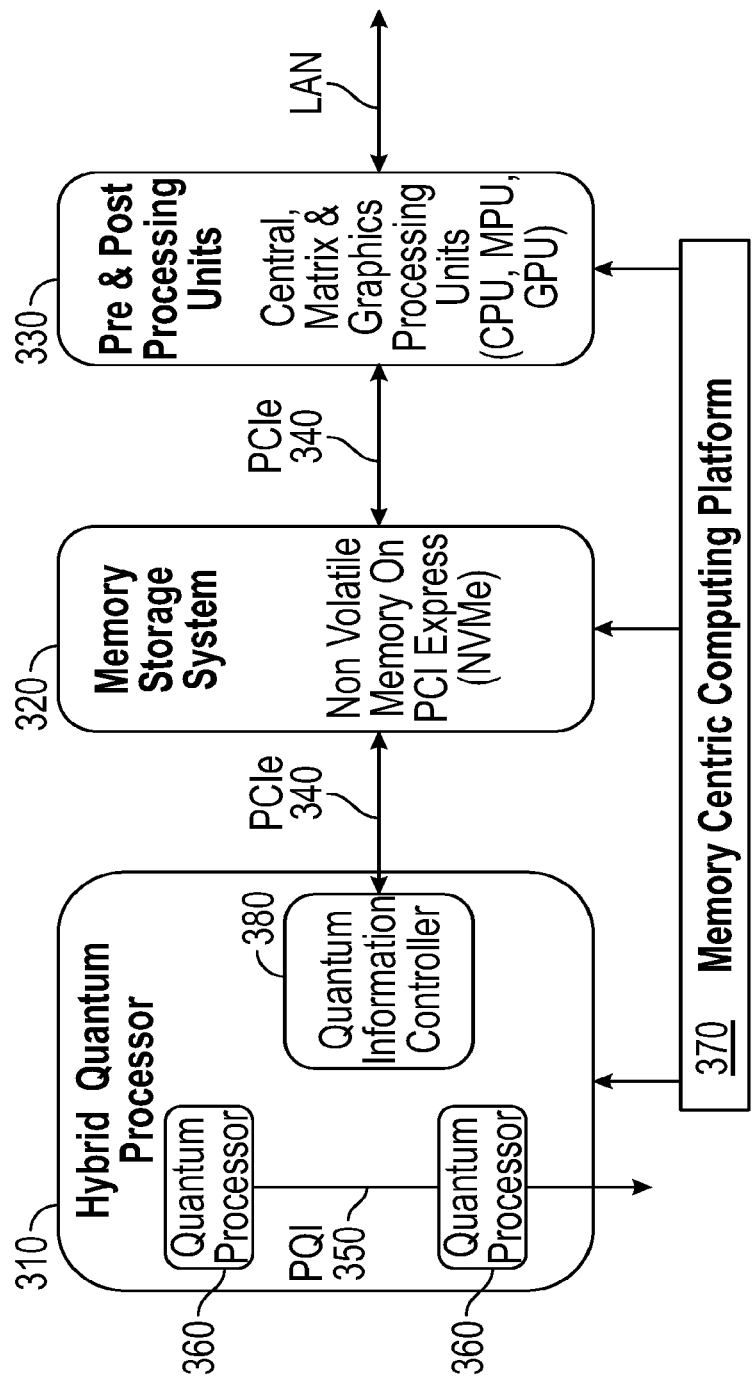
FIG. 3 is a block diagram of an exemplary hybrid quantum computer, consistent with exemplary aspects of certain embodiments of the present disclosure.

In order to achieve and describe the realization of the universal quantum computer in a full and reasonably succinct manner, the disclosed technology is explained based on existing Turing machines, also called servers, and, furthermore, the building blocks of the quantum part, which is implemented in the quantum processor 360, as shown in FIG. 3.

FIG. 3 is a block diagram of an exemplary hybrid quantum computer 300, consistent with exemplary aspects of certain embodiments of the present disclosure. Referring to FIG. 3, system elements including pre- & post-processing units 330, e.g., a Turing processor such as Novarion's Quanton™ Servers, may be utilized to provide the classical part of the universal quantum machine, the read-write-tape, which is realized as a so-called PCI (Peripheral Component Interconnect) express bus 340, or PCIe, as shown in FIG. 3, which, again, illustrates a high-level, exemplary block diagram of a hybrid quantum computer.

To add the quantum computing parts by industrial means, implementations herein may incorporate such quantum computing parts into a Quantum Processing Unit or QPU 360. In order to combine the classical and quantum parts of the hybrid quantum computer in accordance with operational needs, i.e. so that they can be interconnected smoothly and cooperate with high-performance, the classical and quantum processors are arranged in a memory centric computing architecture, including a memory storage system 320, as shown in the exemplary system of FIG. 3. In some implementations, such memory storage system may be implemented via Novarion's PlatinStor™ Storage Systems. In general, such memory storage system 320 may comprise non-volatile memory banks configured to be directly addressed by the PCIe bus, both from the pre- & post processing units 330 and from the hybrid quantum processor platform 310, simultaneously. In order to not compromise the data while being transferred, a key feature of such memory storage system 320 is the inbuilt cache coherence which acknowledges writes only when the data has been physically written and is available for physical read operations of another device. In this manner, this memory storage system 320 has been designed specially to support the memory centric computing platform required, here, which is key to the overall functionality of the hybrid quantum computer introduced herein.

Embodiments of the illustrative architecture of FIG. 3 for the hybrid quantum computer may utilize existing industrial technology, such as different kinds of pre- & post-processing units 330 or Turing processors (such as Novarion's Quanton™ processor, for example), a memory storage system 320 (e.g., non-volatile memory banks, such as PlatinStor™, above), and a PCIe bus 340 to connect the building blocks. As shown in FIG. 3, the Pre- & Post-Processing Units 330 or Turing processors may comprise the general components shown in FIG. 1. Further, in some embodiments, the Pre- & Post-Processing Units 330 or Turing processors may be configured, like Quanton™, to utilize all different kinds of classical processing units, especially at least though not exclusively, central processing units (CPU), matrix processing units (MPU), graphics processing units (GPU) or even neural networks. Every kind of XPU is required to use the inbuilt memory controller within the Pre- & Post-Processing Units 330 which grant access for the XPU components to the centralized memory architecture provided by memory storage system 320 via the PCIe bus.

Further, it is noted that, while certain existing subcomponents of the memory centric computing platform have been developed by the industry, aspects of the present systems and methods may involve innovations stemming as a function of the software and hardware around the PCIe bus, such as via implementation of a cache coherent dataflow between heterogeneous processing units (XPU, QPU) by means of a memory centric architecture. In addition, it is noted that both the pre- & post-processing units 330 (such as the Quanton™ Server System) and memory storage system 320 (such as PlatinStor™) have been already developed by Novarion for interrelated application.

The Hybrid Quantum Processor 310 consistent with the present innovations, also referred to as the IONICS computing platform, is one focus of the presently described inventions, and may be connected to the memory centric computing architecture via the PCIe bus 340 as shown in FIG. 3. The hybrid quantum processor 300 incorporates a plurality of quantum processors, which are connected by a new Photonic Quantum information Interface (PQI) 350. One innovative component of the hybrid quantum processor is the quantum processor core 360, which functioning as shown in FIG. 2 and may be constructed as set forth in FIG. 4.

Figure 4:
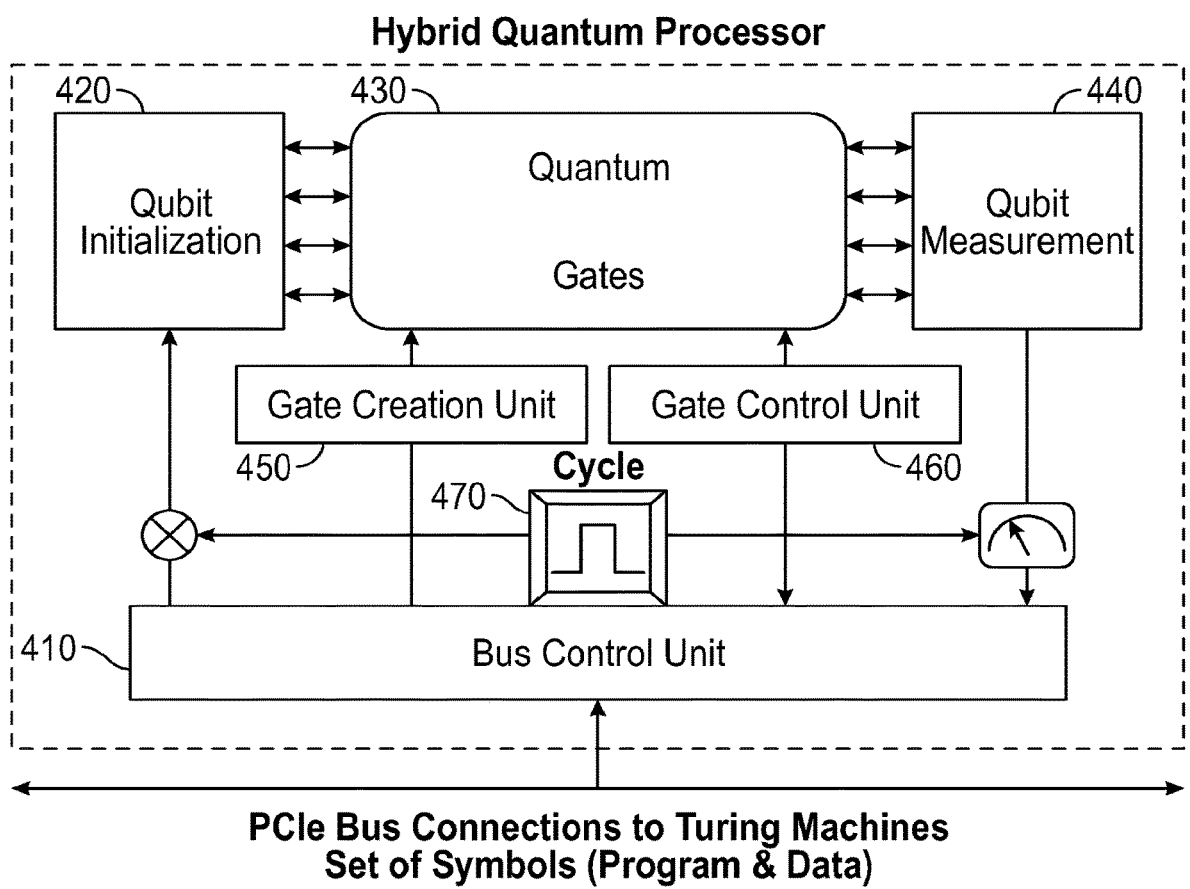
FIG. 4 is a block diagram of an exemplary hybrid quantum processor, consistent with exemplary aspects of certain embodiments of the present disclosure.

FIG. 4 is a block diagram of an exemplary hybrid quantum processor 400, consistent with exemplary aspects of certain embodiments of the present disclosure. Referring to FIG. 4, the presently disclosed architecture separates the classical computing part from the quantum machine—the Quantum gates, which are the arithmetic & logic unit (ALU) 430 built on the qubits—but connects both by a relatively high performing and scalable bus system which is based on industry standards (PCIe). The presently disclosed hybrid quantum processor 400 may be mounted and connected on a printed circuit board (PCB)—motherboard—and consists of a Bus Control Unit 410 (BCU), which is realized as an IC (integrated circuit—FPGA), a Gate Creation Unit 450 (GCRU), which converts the electronic signals from the BCU into parameter for the ALU 430 to superposition and entangle the qubits.

The hybrid quantum processor disclosed herein, such as that of FIG. 4, makes an important architectural difference to any other qubit implementation so far, since the gate creation unit 450 and the gate control unit 460 separate the bus control unit 410 from the quantum register and thus represent the qubit-tie 220 between the classical bus control unit and the quantum register 430, which contains the quantum gates. Additionally, the Gate Control Unit 460 (GCU) performs manipulations on the qubits, which make them immune against disturbances that otherwise cause errors during the performance of quantum information transactions within the quantum gates 430. These qubit control functions are error-correcting operators, which can be implemented as state-of-the-art algorithms and programmed by the bus control unit as a firmware upgrade, e.g., into an existing installation of the hybrid quantum computer operating in a data center.

The qubit initialization 420 creates a set of qubits, up to as many as the Quantum ALU possesses 430 and delivers the quantum information input to the quantum gates 430. The result of the quantum information processing will be retrieved by the qubit measurement units 440 on the right of the quantum ALU (Q-ALU). The measurement results are conveyed to the bus control unit 410 (BCU) where they find a classical memory cache in order to be further transferred via the PCIe bus to the classical memory centric computing architecture and their attached classical processors. The Quantum processor is synchronized by a clock 470 (cycle), which allows the production, processing and measurement of a high number of superpositioned and entangled qubits per time unit. Thus, the calculation power of the hybrid quantum processor is highly scalable in both the number of entangled and superpositioned qubits as well as the number of quantum calculations per second.

The Q-ALU (qubit Arithmetic & Logic Unit 430) disclosed herein is capable of all possible entangled and superpositioned states of the qubits. The qubits inhere quantum information and define a lattice of quantum gates at the same time. With these prerequisites, implementations herein incorporate the representation of all possible quantum states and functions within the Q-ALU. Thus, the present Hybrid Quantum Processor is really a Universal Quantum machine, as defined by the statements in Section 1.

The control unit itself is a Turing machine and hence capable of feeding back classical information to the Q-ALU, via the gate control unit. This feature can be used for instantaneous error correction and, further, the present Quantum processor can autonomously perform whole sets of quantum algorithms and return the results to the classical processor within the server. Systems and methods herein allow the efficient use of the PCIe bandwidth and avoid latency via the PCIe bus.

Since the PCIe system herein is a bus system, implementations herein may connect more than one Quantum processors of this type to several and different conventional processors within the servers. Further, integration of all described parts on a single microchip may be implemented, so that there is a high-speed connection between the Quantum and the classical computing parts. With such integration, the solution is not only useful for servers in data centers, as described by way of example herein, but also for personal computers, smartphones and embedded systems in cars, airplanes and so forth.

3. Technical Features/Aspects for Implementation of a Hybrid Quantum Processor

The inventor's existing findings in Quantum Information Theory explain how a Quantum Information System (QIS) can be used as Quantum Computer. In the following, it is described for the first time, under which conditions a Quantum Information System (QIS) is implemented and utilized as a high-performance Quantum Computer, which principles are part of this invention. The concepts in capital letters are the known notions:

$1^{st}$ DECOHERENCE & the Principle of Isolation:
  the QIS utilized herein is self-contained in a way that other entities of the Universe, apart from the qubit initialization unit, the gate creation unit, the gate control unit and the qubit measurement system, cannot influence or interact with the Q-ALU of the Quantum processor.

$2^{nd}$ FIDELITY & the Principle of Limitation:
  according to physical implementation herein, the elements (particles) of the QIS, which carry the Quantum information—qubits in the Q-ALU—used for the calculation, provide physical qualities, which can be superpositioned and entangled at the same time. Since the particles themselves consists of quantum information, according to the Theory of Quantum Information, they can be superpositioned and entangled by themselves. The physical implementation of the qubits therefore is made in such a manner, that the degrees of freedom of the whole QIS are as much as possible limited to the qubit operations on the selected physical parameters. This limits possible errors during the quantum calculation, which is vital to the success of such an implementation.

$3^{rd}$ COMPLEXITY & the Principle of Manifold:
  although theorists prefer to have QIS described with their well known, highly functional theories in place, an overarching power of the present Quantum Arithmetic and Logic Unit is unleashed by a manifold on different paths of superposition and entanglement. This means that the present advanced quantum computation capabilities cannot be handled by explicit theoretical formalism but inherently on a structural level, like the description of the functionality of a neural network. Thus, the programming of the Hybrid Quantum Computer disclosed herein is not by the definition of algorithms by a software engineer, but there has to be rather a mathematician, the "quantum gate developer", to build structures for the quantum arithmetic and logic unit, which then can be autonomously and newly introduced with any next step in calculation, by the Quantum processor herein before disclosed. Using this principle of manifold in quantum gates, the present quantum machine is a hardware virtualization entity, where hardware and software together is subject to change with any application.

According to the inventor's Theory of Quantum Information, a new understanding of the phenomena of entanglement and superposition was introduced:

Entanglement thereby, the inventor describes as the sharing of a certain quantum information between different entities (=QIS) in the universe. Hence, one can use any physical process to entangle qubits, which changes their states, even if this change is carried out independently on all respective parties, such as Qubits in a Universal Quantum Computer.

Superposition thereby, the inventor describes as the overlap of different pieces of quantum information on one entity (=QIS) in the universe. Hence, different quantum gates can be constructed using the same qubits simultaneously in a Universal Quantum Computer.

4. Physical Building Blocks for Qubits

According to the given principles in Section 3 for the physical systems used in the present Q-ALU, namely Isolation, Limitation & Manifold, various explicit examples of the possible physical entities as building blocks for qubits are as follows:

Photons & Electrons

One of the most accurate theories which humans have ever achieved is the theory of Quantum Electro Dynamics (QED), which describes the interactions between photons and electrons. This is because both particles, according to the aforementioned QIT, represent the simplest components of the universe, which plays us into our hands with the second principle: limitation. These particles are easy to provision and easy to measure. Interestingly, the first attempts to realize a quantum-processing unit with qubits did not choose these easy to handle electrons as carriers of the qubits, but much more complex superconducting quantum circuits on a wafer, which has to be cooled down close to absolute zero, to maintain more or less a decoherence time of the qubits, which one can work with. Additionally the second principle is also very hard to achieve with the Q-ALU prototypes by IBM, Google and D-Wave, since the close to macroscopic elements of the integrated circuits simply have too much degrees of freedom. Therefore, the considerable efforts of these companies to build a practicable quantum-processing unit have not yet been successful.

According to implementations herein, a physically implementation of such a quantum arithmetic & logic unit consequential to the 3 given principles, with particles such as electrons, simple ions like Li+, Be+, H−, He+ or just protons, which are held in a force field, of a magnetic or electric character, and with no other connection to the environment, but addressable with photons, electrons and simple particles and quasiparticles is disclosed.

Protons according to the aforementioned QIT are the third simplest particle in the universe, which thus fulfill the fidelity requirement of the $2^{nd}$ principle. In this manner, implementations herein may use the spin of the proton as property to store the quantum information of the qubit. This is also true for simple electrons. In order to fulfill the $3^{rd}$ principle of complexity with these very simple particles, the establishment of multi reference based spin systems with complex magnetic fields is disclosed (the spins then can be not only up and down, but have many superpositioned directions). The magnetic fields are easy to control within an integrated circuit, even at room temperature, and strong enough on their microscopic distances. It is shown in the aforementioned QIT that with these magnetic fields, aspects of the disclosed technology establish many superpositioned and entangled states on these simple and pure qubits. In this manner, the qubits align much better with the 3 principles.

Furthermore, it is shown that the effects are achieved with electrons in high temperature super conducting materials, making them possible to be easily cooled with liquid nitrogen, instead of the heavy-duty micro-Kelvin machineries needed in existing solutions.

Furthermore, according to the definitions of entanglement & superposition in Section 3, the gate creation and gate control in the present Q-ALU 430 is done with other quantum objects, such as photons and quasiparticles, coming from outside the Q-ALU. This allows the present Gate Control Unit to zero-measure and error correct quantum states during the quantum calculation.

5. The Hybrid Quantum Processor Platform

The presently described theoretical construct called the universal quantum machine of FIG. 2 and the block diagram of the hybrid quantum processor of FIG. 4 represent the first universal architecture having practical and actual implementation for any quantum computer. Since the structure of Quantum gates can be implemented as arithmetic & logic functions in the Q-ALU 430, stored in the Gate creation unit 450, selected by the Bus control unit 410 and properly placed into execution by the Gate control unit 460, a ubiquitous set of quantum gate structures will be achieved with the disclosed universal Quantum computing system, which is referred to herein as the hybrid quantum processor and associated systems and platforms.

As disclosed herein, implementations and features of the present inventions may be implemented through computer-hardware, software and/or firmware. For example, the systems and methods disclosed herein may be embodied in various forms including, for example, one or more data processors, such as computer(s), server(s) and the like, and may also include or access at least one database, digital electronic circuitry, firmware, software, or in combinations of them. Further, while some of the disclosed implementations describe specific (e.g., hardware, etc.) components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various processes and operations according to the inventions or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the inventions, or it may be more convenient to construct a specialized apparatus or system to perform the required methods and techniques.

In the present description, the terms component, module, device, etc. may refer to any type of logical or functional device, process or blocks that may be implemented in a variety of ways. For example, the functions of various blocks can be combined with one another and/or distributed into any other number of modules. Each module can be implemented as a software program stored on a tangible memory (e.g., random access memory, read only memory, CD-ROM memory, hard disk drive) within or associated with the computing elements, etc. disclosed above, e.g., to be read by a processing unit to implement the functions of the innovations herein. Also, the modules can be implemented as hardware logic circuitry implementing the functions encompassed by the innovations herein. Finally, modules may be implemented using special purpose instructions (SIMD instructions), field programmable logic arrays or any mix thereof which provides the desired level performance and cost.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy logic, neural networks, other AI (Artificial Intelligence) or machine learning systems, quantum devices, and hybrids of any of the above device types.

It should also be noted that various logic and/or features disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in tangible various forms (e.g., optical, magnetic or semiconductor storage media), though do not encompass transitory media.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Other implementations of the inventions will be apparent to those skilled in the art from consideration of the specification and practice of the innovations disclosed herein. It is intended that the specification and examples be considered as exemplary only, with a true scope and spirit of the inventions being indicated by the present disclosure and claims and, in certain instances, various associated principles of related patent doctrine.

The invention claimed is:

1. A hybrid quantum computer system comprising:
  a hybrid quantum processor comprising at least one quantum processor and a quantum information controller;
  a peripheral component interconnect (PCI) express bus coupled to the hybrid quantum processor;
  a memory storage system comprising random access memory and coupled to the PCI express bus; and
  a plurality of pre-processing units and a plurality of post-processing units, both of which are comprised of different types of processing units and coupled to the PCI express bus;
  wherein the system is based on a memory centric computing architecture and is configured to connect the different types of processing units together with the at least one quantum processor via the PCI express bus, wherein each of the at least one quantum processor is fully addressable, the memory centric computing architecture characterized by:
    memory banks, of the random access memory, being configured to be directly addressed by the PCI express bus, both from the plurality of pre-processing units and the plurality of post-processing units and from the hybrid quantum processor, simultaneously, such that the memory storage system serves as a centralized memory architecture therebetween; and
    an inbuilt cache coherence that acknowledges writes only when data has been physically written and is available for physical read operations of another device.

2. The system of claim, 1, wherein one or both of: the qubits are configured to store the quantum information over a same time period defined by one or more cycles of the clock; and/or the qubits are configured to transition into different states per time unit as defined by the clock cycle.

3. The system of claim, 1, further comprising:
  a qubit-tie computing component coupled to the quantum register, the qubit-tie computing component comprising a superposition component;
  wherein the qubit-tie computing component is coupled to the quantum register via an entanglement component and the superposition component.

4. The system of claim, 1, further comprising: a gate control unit that performs manipulations on the qubits that configure the qubits such that the qubits are immune from disturbances.

5. The system of claim 4, further comprising an error correcting component within the gate control unit which corrects errors on one or more of the qubits.

6. The system of claim 3, wherein the qubit-tie computing component comprises an additional quantum system, positioned between a read/write component and the quantum register.

7. The system of claim 1, further comprising one or more additional components implementing at least one of a decoherence aspect, a fidelity aspect, and/or a complexity/manifold aspect to facilitate implementation of a quantum processing unit (QPU).

8. The system of claim 1, wherein the qubits are implemented as one or more elementary particles, and wherein the elementary particles are configured to store one or more states and/or characteristics and are confined to preventing interaction with external elements that alter the one or more states and/or characteristics.

9. The system of claim 1, wherein the qubits are implemented as one or more elementary particles, and wherein the elementary particles comprise one or more simple elementary particles defined as being superconducting electrons, vacuum isolated protons, H−, Het, and/or other light ions respectively anions.

10. The system of claim 1, wherein the qubits are implemented as one or more elementary particles, and wherein the elementary particles are: trapped in artificial force fields, and shielded from any incoming particle or quasi-particle.

11. The system of claim 1, wherein the qubits are implemented as one or more elementary particles and the elementary particles are trapped in artificial force fields; wherein the artificial force fields include one or more microscopic force fields; and wherein, optionally, the microscopic force field include and/or involve atom bodies in a crystal provided to electrons in a conduction band within a high temperature superconductor.

12. The system of claim 1, further comprising:
a quantum register that stores quantum information using qubits.

13. The system of claim 1, wherein the system is configured to provide a cache coherent dataflow between heterogenous processing units via the memory centric computing architecture.

14. The system of claim 1, wherein the system further comprises an inbuilt cache coherence that acknowledges writes only when the data has been physically written and is available for physical read operations of another device.

15. The system of claim, 1 wherein two or more of:
the qubits are configured to be entangled with one or more different systems and/or entities external to the system;
the qubits are configured to be transitioned into superposed states defined by characteristics of the particles or objects; and/or
the system stores the qubits in different states using physical qualities, wherein the physical qualities define qubits that are configured to be entangled and superposed at a same time.

16. The system of claim 1, wherein the qubits are configured to be entangled with one or more different systems and/or entities external to the system.

17. A hybrid quantum processor system comprising:
a memory storage system comprising random access memory;
a peripheral component interconnect (PCI) express bus coupled to the memory storage system;
a plurality of pre-processing units and a plurality of post-processing units, both of which are comprised of different types of processing units and coupled to the PCI express bus; and
a hybrid quantum processor coupled to the PCI express bus and comprising:
an arithmetic and logic unit (ALU) comprising a plurality of quantum gates that store first quantum information; and
one or more gate creation units and/or gate control units coupled to the ALU and configured for one or both of entanglement and/or superposition with second quantum information stored on particles or objects external to the ALU;
wherein the PCI express bus couples the one or more gate creation units and/or gate control units to the particles or objects external to the ALU, wherein, as a function of the first quantum information being coupled to the second quantum information, the ALU is configured to provide the plurality of quantum gates as ubiquitous types of gates, and thereby yield universal quantum machine codes, and
wherein the system has a memory centric computing architecture characterized by:
memory banks, of the random access memory, being configured to be directly addressed by the PCI express bus, both from the plurality of pre-processing units and the plurality of post-processing units and from the hybrid quantum processor, simultaneously, such that the memory storage system serves as a centralized memory architecture therebetween; and
an inbuilt cache coherence that acknowledges writes only when data has been physically written and is available for physical read operations of another device.

18. The system of claim 17, further comprising one or more additional components implementing at least one of a decoherence aspect, a fidelity aspect, and/or a complexity/manifold aspect to facilitate implementation of a quantum processing unit (QPU).

19. A system comprising:
a memory storage system comprising random access memory;
a peripheral component interconnect (PCI) express bus coupled to the memory storage system;
a plurality of pre-processing units and a plurality of post-processing units, both of which are comprised of different types of processing units and coupled to the PCI express bus; and
a hybrid quantum processor coupled to the PCI express bus and comprising an information controller and one or more quantum processing units, wherein each of the quantum processing units comprises:
a quantum register that stores quantum information using qubits, wherein the qubits are configured to store the quantum information using particles or objects arranged in a lattice of quantum gates;
a clock that provides a clock cycle to the quantum register; and
a qubit-tie computing component coupled to the quantum register, wherein the qubit-tie computing component is configured to shift the quantum information between the qubits; and
a bus control unit that receives and is configured to cache the quantum information into classical memory in order to be further transferred to the PCI express bus;
wherein the system stores the qubits in different states using physical qualities; and
wherein the system has a memory centric computing architecture characterized by:
memory banks, of the random access memory, being configured to be directly addressed by the PCI express bus, both from the plurality of pre-processing units and the plurality of post-processing units and from the hybrid quantum processor, simultaneously, such that the memory storage system serves as a centralized memory architecture therebetween; and
an inbuilt cache coherence that acknowledges writes only when data has been physically written and is available for physical read operations of another device.

20. The system of claim 19, wherein the quantum register comprises an entanglement component, and wherein the qubits are configured to be entangled with one or more different systems and/or entities external to the system.

21. The system of claim 19, the qubit-tie computing component comprising a superposition component, and wherein the qubits are configured to be transitioned into superposed states defined by characteristics of the particles or objects.

22. The system of claim 19, wherein the physical qualities define qubits that are configured to be entangled and superposed at a same time.

23. The system of claim 19, wherein the qubits are configured to store the quantum information over a same time period defined by one or more cycles of the clock.

24. The system of claim 19, wherein the qubits are configured to transition into different states per time unit as defined by the clock cycle.

25. The system of claim 19, wherein the qubit-tie computing component is coupled to the quantum register via an entanglement component.

26. The system of claim 19, wherein the qubit-tie computing component is coupled to the quantum register via a superposition component.

27. The system of claim 19, wherein the qubit-tie computing component is coupled to the quantum register via an entanglement component and a superposition component.

28. The system of claim 19, further comprising:
a gate control unit that performs manipulations on the qubits that configure the qubits such that the qubits are immune from disturbances.

29. The system of claim 28, further comprising an error correcting component within the gate control unit which corrects errors on one or more of the qubits.

30. The system of claim 19, wherein the qubit-tie computing component comprises an additional quantum system, positioned between a read/write component and the quantum register.

31. The system of claim 19, further comprising one or more additional components implementing at least one of a decoherence aspect, a fidelity aspect, and/or a complexity/manifold aspect to facilitate implementation of a quantum processing unit (QPU).

32. The system of claim 19, wherein the qubits are implemented as one or more elementary particles, and wherein the elementary particles are configured to store one or more states and/or characteristics and are confined to preventing interaction with external elements that alter the one or more states and/or characteristics.

33. The system of claim 19, wherein the qubits are implemented as one or more elementary particles, and wherein the elementary particles comprise one or more simple elementary particles defined as being superconducting electrons, vacuum isolated protons, H−, He+, and/or other light ions respectively anions.

34. The system of claim 19, wherein the qubits are implemented as one or more elementary particles, and wherein the elementary particles are: trapped in artificial force fields, and shielded from any incoming particle or quasi-particle.

35. The system of claim 19, wherein the qubits are implemented as one or more elementary particles and the elementary particles are trapped in artificial force fields.

36. The system of claim 35, wherein the artificial force fields include one or more microscopic force fields.

37. The system of claim 35, wherein the microscopic force field include and/or involve atom bodies in a crystal provided to electrons in a conduction band within a high temperature superconductor.

38. The system of claim 1, further comprising one or more additional components implementing two or more of a decoherence aspect, a fidelity aspect, and/or a complexity/manifold aspect to facilitate implementation of a quantum processing unit (QPU).

39. The system of claim 1, wherein the qubits are configured to be transitioned into superposed states defined by characteristics of the particles or objects.

40. The system of claim 1, currently amended wherein the system stores the qubits in different states using physical qualities.

41. The system of claim 40, wherein the physical qualities define qubits that are configured to be entangled and superposed at a same time.

42. The system of claim 1 wherein the quantum register comprises an entanglement component, and wherein the qubits are configured to be entangled with one or more different systems and/or entities external to the system.

43. The system of claim 1, further comprising:
a qubit-tie computing component coupled to the quantum register, wherein the qubit-tie computing component comprising a superposition component, and wherein the qubits are configured to be transitioned into superposed states defined by characteristics of the particles or objects.

44. The system of claim 17, further comprising:
a quantum register that stores quantum information using qubits.

45. The system of claim 44, wherein the qubits are configured to be entangled with one or more different systems and/or entities external to the system.

46. The system of claim 44, wherein the qubits are configured to be transitioned into superposed states defined by characteristics of the particles or objects.

47. The system of claim 44, wherein the system stores the qubits in different states using physical qualities, wherein the physical qualities define qubits that are configured to be entangled and superposed at a same time.

48. The system of claim 44, wherein the qubits are configured to store the quantum information over a same time period defined by one or more cycles of the clock.

49. The system of claim 44, wherein the qubits are configured to transition into different states per time unit as defined by the clock cycle.

50. The system of claim 44, wherein two or more of:
the qubits are configured to be entangled with one or more different systems and/or entities external to the system;
the qubits are configured to be transitioned into superposed states defined by characteristics of the particles or objects; and/or
the system stores the qubits in different states using physical qualities, wherein the physical qualities define qubits that are configured to be entangled and superposed at a same time.

51. The system of claim 44, further comprising:
a qubit-tie computing component coupled to the quantum register, the qubit-tie computing component comprising a superposition component.

52. The system of claim 51, wherein the qubit-tie computing component is coupled to the quantum register via an entanglement component.

53. The system of claim 51, wherein the qubit-tie computing component is coupled to the quantum register via a superposition component.

54. The system of claim 51, wherein the qubit-tie computing component is coupled to the quantum register via an entanglement component and a superposition component.

55. The system of claim 51, wherein the qubit-tie computing component comprises an additional quantum system, positioned between a read/write component and the quantum register.

56. The system of claim 44, further comprising:
a gate control unit that performs manipulations on the qubits that configure the qubits such that the qubits are immune from disturbances.

57. The system of claim 56, further comprising an error correcting component within the gate control unit which corrects errors on one or more of the qubits.

58. The system of claim 17, further comprising one or more additional components implementing two or more of a decoherence aspect, a fidelity aspect, and/or a complexity/manifold aspect to facilitate implementation of a quantum processing unit (QPU).

59. The system of claim 44, wherein the qubits are implemented as one or more elementary particles, and wherein the elementary particles are configured to store one or more states and/or characteristics and are confined to preventing interaction with external elements that alter the one or more states and/or characteristics.

60. The system of claim 44, wherein the qubits are implemented as one or more elementary particles, and wherein the elementary particles comprise one or more simple elementary particles defined as being superconducting electrons, vacuum isolated protons, H−, He+, and/or other light ions respectively anions.

61. The system of claim 44, wherein the qubits are implemented as one or more elementary particles, and wherein the elementary particles are: trapped in artificial force fields, and shielded from any incoming particle or quasi-particle.

62. The system of claim 44, wherein the qubits are implemented as one or more elementary particles and the elementary particles are trapped in artificial force fields.

63. The system of claim 62, wherein the artificial force fields include one or more microscopic force fields.

64. The system of claim 62, wherein the microscopic force field include and/or involve atom bodies in a crystal provided to electrons in a conduction band within a high temperature superconductor.

65. The system of claim 17, wherein the system is configured to provide a cache coherent dataflow between heterogenous processing units via the memory centric computing architecture.

66. The system of claim 17, wherein the system further comprises an inbuilt cache coherence that acknowledges writes only when the data has been physically written and is available for physical read operations of another device.

* * * * *